Feb. 4, 1969  K. H. STEIGERWALD  3,426,173
MACHINING DEVICE USING A CORPUSCULAR BEAM

Inventor:
KARL HEINZ STEIGERWALD

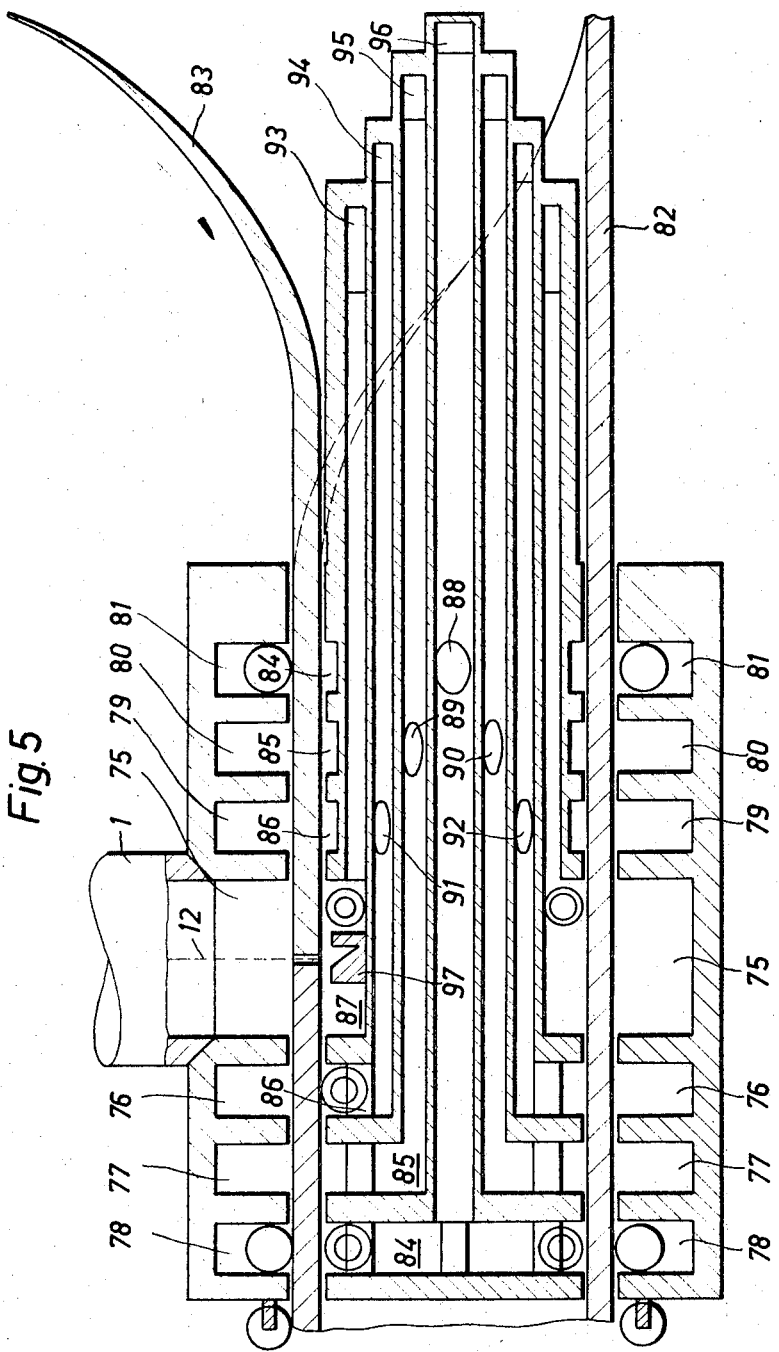

United States Patent Office 3,426,173
Patented Feb. 4, 1969

3,426,173
MACHINING DEVICE USING A
CORPUSCULAR BEAM
Karl Heinz Steigerwald, 6 Bahnhofstrasse,
7083 Wasseralfingen, Germany
Filed Aug. 6, 1965, Ser. No. 477,691
Claims priority, application Germany, Aug. 8, 1964,
St. 22,516
U.S. Cl. 219—121                 9 Claims
Int. Cl. B23k 15/00

ABSTRACT OF THE DISCLOSURE

A device is described for welding a longitudinal pipe seam with a workpiece-penetrating beam of charged particles wherein the pipe seam is produced by forming a continuous flat stock workpiece material into a tubular shaped pipe wall wherein the pipe has an end thereof in communication with atmospheric pressure. A gaseous sealing member is inserted internal to the pipe to effectively gaseously seal the internal portion of the pipe directly below the seam being welded by the beam from the end exposed to atmospheric pressure. An annular external evacuated chamber is described which embraces the entire external circumference of the pipe and covers an axial section of the pipe seam immediately adjacent the welding point. Several intermediate pressure stretches are provided flanking the main beam working chamber which is spaced with slight radial clearance from the pipe to permit free continuous passage of the pipe and at the same time minimize gaseous flow into the beam working chamber. An internal gaseous sealing member may be provided with a beam working chamber on the inner side of the pipe opposite the external beam working chamber and is evacuated to a pressure substantially the same as the pressure in the external beam working chamber. An intermediate pressure stretch is provided on the side facing the atmospheric opening of the pipe to further provide sealing of the welding vicinity. Another charged particle beam working apparatus is described wherein the beam working area is defined by a peripheral wall spaced from the workpiece and provided with an annular pressure stretch surrounding the beam working area and which is also spaced with clearance from the workpiece. Pumps are provided to remove gas leaking through the clearance. The peripheral wall and the annular pressure stretch may be telescopically moved along a path parallel with the beam.

---

This invention relates to improved apparatus for welding with corpuscular beams and, more particularly, relates to improved vacuum staging capable of use with large workpieces.

It is known to machine workpieces by means of a corpuscular beam, for example, an electron beam. Thus, it is prior art to use a corpuscular beam for drilling, milling, cutting, soldering, welding, hardening and similar heat treatments.

In these techniques, the workpiece is usually set up in the vacuum required for generation of the corpuscular beam. This type of setup entails difficult vacuum technology problems, since all equipment for moving the workpiece must pass through the housing without destroying the vacuum. In addition, large, and consequently expensive vacuum chambers are required for processing larger workpieces.

In order to avoid this disadvantage, it is known to provide the beam generating device with a pressure step system consisting of several chambers separated by diaphragms, each of which is connected to a vacuum pump, and to project the corpuscular beam into a room which is under higher pressure, for example, under atmospheric pressure. Above all, projection of the beam into free atmosphere is advantageous, since it is then possible to machine a workpiece without being obstructed by a vacuum chamber. However, this technique entails a number of disadvantages. In the first place, the propagation of the beam in a room under higher pressure is disturbed, as is known, by diffusion. The beam then spreads rapidly, so that the power densities which can be attained are considerably lower than those to be obtained in a good vacuum. Also, the possibilities for beam control, for example, by deflection, are less favorable than in vacuum. In addition, X-ray radiation is produced at the workpiece, which entails difficult technical shielding problems.

Another suggestion made in the past was to equip the beam generating system with a pressure step and to arrange a check valve behind this pressure step in the direction of the beam. In this device, the beam exit opening proper is provided with an annular seal which is placed on the surface of the workpiece. Consequently, the working space proper is here formed by the workpiece, the seal and the beam exit diaphragm, and it is very small. As soon as the seal has been positioned on the workpiece, the check valve is opened, and the gas entering from the working space is removed by the vacuum pumps connected to the chambers of the pressure step system. The workpiece is, thus, processed in the vacuum required for producing the corpuscular beam. The main disadvantage of this device is that only small spots can be machined and that the process of evacuation must be repeated whenever the machining spot changes.

It is the purpose of the present invention to create a machining device using a corpuscular beam, which is free from the drawbacks of presently known devices and which, in addition, offers a few essential advantages.

The primary object of the present invention is to permit workpieces of any size to be processed outside the vacuum required for producing the beam.

In accordance with this object, there is provided a machining device using a corpuscular beam generated in a housing with an initial pressure which differs from atmospheric pressure. The invention is distinguished by a working chamber placed on the workpiece, a pressure step system surrounding this chamber and consisting of several chambers in which different pressures are maintained, which serves to maintain a pressure in the working chamber, which is between the initial pressure and atmospheric pressure, as well as a pressure step system of known design for projecting the corpuscular beam into the working chamber, which is connected to the device producing the corpuscular beam, while it is also connected in a pressure-tight manner too, but easily removable from said chamber.

Thus, the workpiece is here processed in an intermediate vacuum which is adapted to the particular characteristics of the corpuscular beam at the machining spot. The intermediate vacuum should in any case be chosen so that the corpuscular beam is not unduly spread by diffusion. Above all, it is also possible to choose the intermediate vacuum so that the corpuscular beam forms a narrow, parallel sided beam, thus, creating more favorable conditions for its focusing in the working chamber.

The intermediate vacuum in the working chamber is maintained by the pressure step system arranged outside the chamber, while the pressure step system connected to the beam generating device maintains the required initial pressure in this unit. Consequently, there are two different pressure step systems between initial pressure and atmospheric pressure, viz. an inner system and an outer system. The outer system and the working chamber can easily be replaced, so that the device can be quickly adapted to workpiece surfaces of different shape. The outer system with the working chamber is pressed against the workpiece surface with the required pressure by the intermediate vacuum produced on the inside.

The working chamber is only placed over the workpiece, for example, by means of rollers. These rollers lift the open edges of the working chamber in such a manner off the workpiece that a very fine gap remains between them and the workpiece surface. The air entering through this gap is sucked off by the outer pressure step system. The working chamber can be freely displaced over the workpiece with the possibility of continuous processing of the workpiece.

In order to facilitate the machining operation, it is advisable to provide rails or similar guides on the workpiece or to attach them temporarily, in order to guide the working chamber along the machining point, for example, along a welding seam, and to align it with the latter. For the same purpose, feelers or measuring elements which may, for example, determine the location of the spot or seam to be welded, can be employed inside or outside the chambers.

It is advantageous to connect the inner pressure step system belonging to the beam generating unit and the working chamber by means of a conical or spherical seat. This allows the working chamber to be replaced easily and simply. With the aid of a selection of worknig chambers of different vacuum characteristics and different shape, one and the same beam generating unit can, thus, be adapted to widely varying operating conditions and workpiece configurations. If a spherical seat is used, the working chamber can to a certain degree be tilted freely with respect to the beam generating unit.

In order to adapt the working chamber to the configuration of the workpiece either during or before the machining operation, it is advisable to design the working chamber and the chambers of the pressure step system around it so that they can be displaced telescopically one with respect to another.

A valve which opens only when the desired pressure has been achieved in the chamber should preferably be disposed at the exit of the pressure step connected to the beam generating unit. This avoids disturbances due to possibly changing pressure within the working chamber.

Irregularities on the workpiece may give rise to variations in the gap width between the outer pressure systems and the workpiece, which in turn may lead to fluctuations of pressure in the working chamber. In order to compensate such fluctuations it may be advisable to provide pressure measuring elements in the individual chambers of the pressure step systems, which are used to control valves and pumps for the purpose of maintaining a uniform pressure level.

If the new device is used to produce or weld a slit in the workpiece, the workpiece spot opposite the impact spot of the beam must be surrounded by a chamber in which at least the same pressure is maintained as in the working chamber. This cover chamber may be provided over the entire length of the slit, the sealing being stationary. However, the cover chamber may also be fitted with an outer pressure step system. During processing of the slit, the working chamber and the cover chamber are then displaced in synchronism. For this purpose, a mechanical link around the workpiece may be used between the two chambers or a servo system may be employed for synchronous displacement of the working and cover chambers.

If there are larger, variable width gaps between the workpiece surfaces to be welded together, it may be advisable to extend the walls of the outer pressure step system of the working chamber in a comb-like pattern through the gap and to connect them to the cover chamber on the reverse side of the workpiece. In this manner, the effect of the pressure steps extends through the gap.

In this case, the additional material required for filling the gap is, for example, fed from the interior of the cover chamber.

If in the production of a welding seam the workpieces are not in close and accurate contact with the welding point, it is also possible to seal the existing slit and to dispense with a cover chamber. This can easily be done by adhering a thin plastic foil over the slit. This foil may, for example, be removed shortly before the welding point is reached, or it may simply be cut by the beam. Another possibility is to adhere such foils to the workpiece surface adjacent the seam or to apply an appropriate coating agent such as lacquer to take up variation in workpiece roughness. Relatively fine and uniform gaps are, thus, formed between the working chamber with its pressure step chambers and the workpiece surface.

In order to shield the outside sufficiently from the X-ray radiation produced during machining, both the cover chamber and the working chamber with the respective pressure step systems can be dimensioned adequately and, if necessary, provided with lead shields. Care must in this case be taken to cover the workpiece proper in a sufficient width to guarantee that the absorptivity of the covered portion of the workpiece perpendicular to the weld surface and welding direction is at least sufficient for attentuating the X-ray radiation to the required extent.

The new device can be used for machining a wide variety of workpieces. It is only necessary to provide appropriately shaped working chambers.

Having briefly described this invention, it will be described in greater detail in the following portions of the specification, which may best be understood by reference to the accompanying drawings, of which:

FIG. 5 is a sectioned view through a working chamber used for welding pipes.

Figure 1:
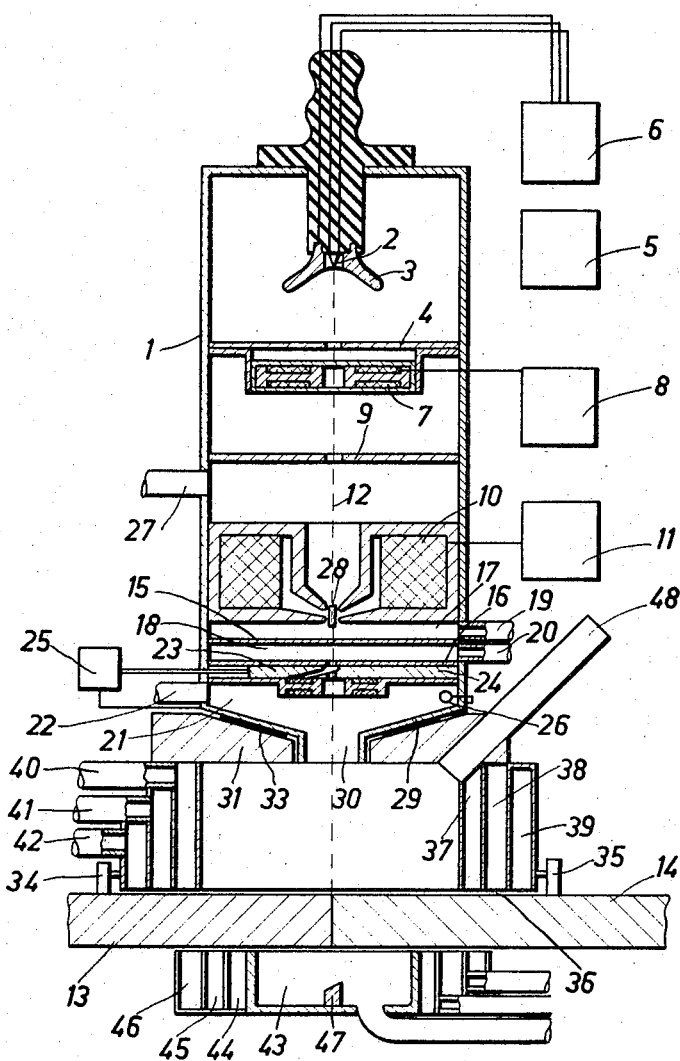
FIG. 1 is a sectioned view through an embodiment of the present invention suited for welding two planar workpieces together.

In FIG. 1, there is shown an electron beam generator 1. The generator contains the beam generating system consisting of the cathode 2, the control electrode 3 and the anode 4. The units 5 and 6 serve to generate the high voltage, the filament current and the control voltage supplied to the electrode 3. Below the anode 4 is the deflecting system 7 serving for beam adjustment, which is supplied with power by the unit 8. Below the deflecting system 7 is a diaphragm 9 which can be displaced in the diaphragm plane by means not shown in the drawing. The electromagnetic lens 10, whose power supply unit is marked 11, serves to focus the electron beam 12 onto the workpieces 13 and 14 to be welded together. A small tube 28 of nonmagnetic material, which is provided with a narrow bore, is arranged between the pole shoes of the lens 10.

Below the focusing lens 10, there are two diaphragms 15 and 16 provided with relatively small bores. The chambers 17 and 18 are, thus, formed, each of which is connected to a vacuum pump via the lines 19 and 20, respectively. The chamber 18 is followed by another chamber 21 which is likewise connected to a vacuum pump via a line 22. The space above the focusing lens 10 is also constantly connected to a vacuum pump via a line 27. Between the chambers 18 and 21, there is a check valve which consists essentially of the movable wedge 23 and the block 24. An electromagnet 25 pulls the wedge 23 to the left as soon as the vacuum gage 26 indicates correct pressure in the chamber 21. When this pressure is exceeded, the wedge 23 is automatically pushed to the right via the magnet 25 and the check valve thus closed.

The chambers 17, 18, 21 are so-called intermediate pressure chambers, i.e. a certain pressure can be maintained within them via the vacuum pumps to which they are connected. Thus, for example, the bores in the diaphragms 15 and 16 and the vacuum pumps connected to the chambers 17 and 18 can be chosen so that a pressure of $10^{-4}$ mm. Hg is maintained in the beam generator, a pressure of $10^{-2}$ mm. Hg in the chamber 17, and a pressure of $10°$ mm. Hg in the chamber 18, provided that the pressure in the chamber 21 is $4°$ mm. Hg.

The lower end of the device 1 has a conical wall 29 and an aperture 30. With the conical wall 29, the device 1 rests on the matching conical wall 31 of the working chamber 32. A seal 33 is provided between the walls 29 and 31. This guarantees that the device 1 is in perfect contact with, but easily removable from the working chamber 32.

The working chamber 32 rests with the rollers 34 and 35 on the workpieces 13, 14. A fine gap 36 is, thus, produced between the surface of the workpieces and the lower edge of the walls of the working chamber.

The working chamber 32 is surrounded by the outside chambers 37, 38 and 39, each of which is connected to a vacuum pump via the lines 40, 41 and 42, respectively. This pump sucks off the air entering through the gap 36, so that the chambers 37, 38, 39 are intermediate pressure chambers. Thus, a pressure of 40 mm. Hg can be maintained in the working chamber 32, a pressure of 100 mm. Hg in the chamber 37, a pressure of 300 mm. Hg in the chamber 38, and a pressure of 500 mm. Hg in the chamber 39.

At the rear of the workpieces 13, 14 is a cover chamber 43 which rests on the workpieces on rollers not shown in the drawing. Like the working chamber, this cover chamber is provided with outer intermediate pressure chambers 44, 45 and 46, with the aid of which the same pressure can be maintained in the chamber 43 as in the working chamber 32. The chambers 44, 45 and 46 are either connected via pump lines to the respective pumps of the chambers 37, 38 and 39, or the desired vacuum within them is maintained by means of appropriate separate pumps.

In the cover chamber 43, there is an electrode 47 on which the electron beam 12 impinges after penetrating the workpieces 13, 14. The signal thus generated can be used to move the cover chamber 43 along the welding seam in synchronism with the working chamber 32.

In order to permit the weld to be watched, the working chamber 32 is provided with a viewing system 48 which is shown schematically. A corresponding viewing system for the underside of the weld can be provided in the cover chamber 43.

It should be mentioned that FIG. 1 gives only an example of the design of the pressure step systems 17, 18, 21 and 37, 38, 39. For example, it is also possible to make up the inner pressure step system of nesting-type intermediate pressure chambers. In addition it is possible to provide a movable seal between the outermost chamber of the outer pressure step system and the workpiece surface in order to reduce the pumping requirement to a minimum.

If the gap between the workpieces 13, 14 is very narrow, the cover chamber 43 can be dispensed with. In this case, the gap can, for example, be closed by sticking a thin plastic foil over it. This foil is either removed shortly before the weld is reached or simply cut by the beam.

Figure 2:
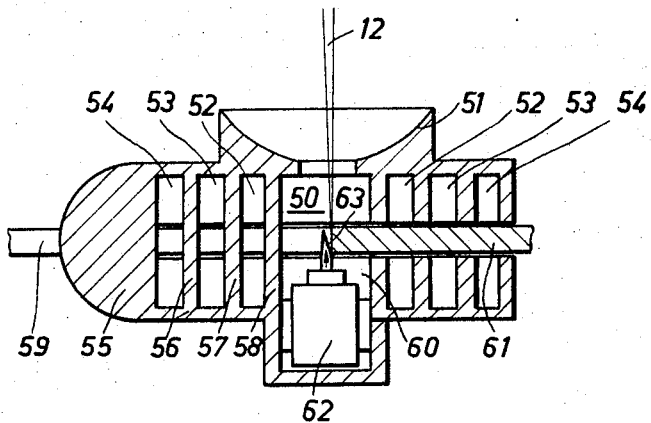
FIG. 2 is a sectioned view through a working chamber used for welding two workpieces together, between which there is a relatively wide gap.

FIG. 2 shows a working chamber 50 whose upper end is provided with a spherical seat 51. The generator 1 in FIG. 1 is placed on this seat, in this particular case being provided with a hemispherical wall instead of the conical wall 29.

The working chamber 50 is surrounded by the intermediate pressure chambers 52, 53 and 54. The walls 55, 56, 57 and 58 of these chambers extend at one point in a comb-like pattern through the gap between the workpieces to be welded together. FIG. 2 shows a section along this gap, so that only one workpiece 59 is visible. As will be noted, the walls 55, 56, 57 and 58 extend through the still open gap between the workpieces and are connected to the cover chamber 60 at the back of the workpieces. The effect of the pressure steps extends through the gap between the workpieces, so that the cover chamber 60 does not require separate vacuum pumps or lines, provided that the gap is wide enough. In the welded area 61, the pressure steps on the upper and lower sides of the workpiece are separated to clear the welded seam. The cover chamber 60 contains a device 62 with the aid of which additional material 63 is continuously fed to the gap.

In the case of the working chamber shown in FIG. 2, the cover chamber 60 is always moved together with the working chamber 50, so that special means for controlling the displacement of the cover chamber are not required.

Similar to the example shown in FIG. 2, the working chamber can in many other cases be connected mechanically to the cover chamber. This connection can be of the permanent type or, by suitable design, easily detachable, so that the welding unit can be easily and quickly attached to the workpieces. Above all, this possibility exists also in the processing of pipes or special workpiece configurations.

Figure 3:
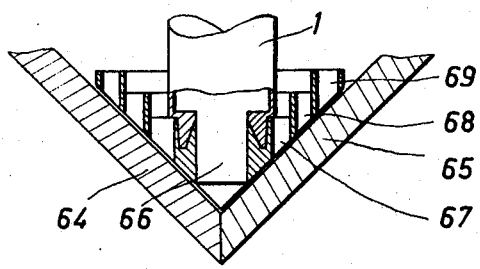
FIG. 3 is a sectioned view through a working chamber used for welding two workpieces together at an angle.

FIG. 3 shows a working chamber 66 used for welding the two workpieces 64, 65 together, which make a right angle. In this case, the intermediate pressure chambers 67, 68, 69 surrounding the chamber 66 are so designed that their walls make a small gap with the surface of the workpieces 64, 66.

Figure 4:
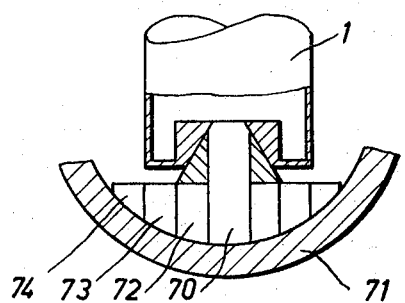
FIG. 4 is a sectioned view through a working chamber used for processing two curved workpieces.

The working chamber 70 shown in FIG. 4 is used for processing a curved workpiece 71. The intermediate pressure chambers 72, 73, 74 are so designed that their walls make a small gap with the surface of the workpiece.

For the sake of clarity, the connections between the intermediate pressure chambers and the vacuum pumps are not shown in the FIGURES 3 and 4, nor have the rollers been included with which the working chambers rest on the workpieces. Any cover chambers which may be required should be designed in accordance with the working chambers.

FIG. 5 shows an annular working chamber 75 surrounded by the intermediate pressure chambers 76, 77, 78, 79, 80, 81 which are likewise of annular design. The chambers 76, 79, 77, 80 and 78, 81 may be interconnected, but may also be individually connected to vacuum pumps. A metal sheet 82 is moved from right to left and bent up by means not shown so that a pipe is formed at the point of the working chamber 75. Additional material 83 is continuously fed to the gap thus formed and the gap welded by means of the electron beam 12. During this operation, the working chamber remains stationary, while the sheet 82 is continuously advanced from right to left.

In this particular case, the cover chamber is arranged in the interior of the pipe. It is likewise of annular design and marked 87. The chamber 87 is surrounded by intermediate pressure chambers 84, 85, 86. The left hand chamber 84 is connected with the right hand chamber 84 via the opening 88. Accordingly, the chambers 85 are connected via the openings 89, 90, and the chambers 86 via the openings 91, 92. The connections to the vacuum pumps are marked 93, 94, 95, 96.

The cover chamber 87 contains a collecting electrode 97 which is disposed at an angle to the direction of beam incidence. The signal generated by this electrode controls the advance of the sheet 82.

A number of rollers may be used to guide the sheet between the working chamber 75 and the cover chamber 87. These rollers determine the width of the air gaps between the walls of the chambers and the workpiece faces.

Working and cover chambers of the type shown in FIG. 5 are preferably used for welding longitudinal and transversal seams on all kinds of pipes, round stock and sectional material and are particularly suitable for processing all kinds of continuous bars. In the case of solid bars, the inner cover chamber shown in FIG. 5 is, of course, not applicable. Continuous material produced by rolling or continuous casting can, thus, be machined by means of corpuscular beams, particularly for the purpose of cutting, separating, welding, soldering, thermal treatment and coating of its surface as well as for the purpose of measurement with the aid of the effects produced by exposure to corpuscular radiation. Since such material is not usually of the endless type but necessitates certain interruptions, funnel-shaped extensions and devices should be provided on the feed side, which guarantee perfect feeding and passing of the material. When the passage of material was interrupted and the chamber is empty, a device working on the principle of the valve 23, 24 shown in FIG. 1 automatically closes the source of corpuscular radiation and reopens only when the passage of material is resumed. In order to ensure perfect machining of the ends of the material, it is advisable to provide means for closing the chamber which is still or already open upon entrance or exit of the material, thus ensuring that the pressure in the working chamber is not reduced or increased too late or too early, respectively. Such locks may under certain conditions serve to keep the working chamber constantly closed during interruptions in material passage and, thus, to maintain the required working pressure.

In all the instances mentioned above, it is advisable to control the different functions of the vacuum system as a function of the working cycle.

The intermediate pressure systems described can be applied not only for machining by means of corpuscular beams, but also for measurements performed with the aid of corpuscular beams as well as for all kinds of vacuum techniques applied to portions of larger objects, in which an intermediate pressure between the vacuum in a linked-up vessel on the one hand and the higher outside pressure on the other is desired at the point of application.

This invention may be variously modified and embodied within the scope of the subjoined claims.

What is claimed is:

1. A device for welding with a work-piece-penetrating beam of charged particles with the beam welding a longitudinal pipe seam produced when forming continuous flat stock workpiece material into tubular shaped pipe wall with the welded pipe having one end thereof in communication with atmospheric pressure, comprising
    an evacuated beam-generating chamber having a first beam exit port,
    means for generating a beam of charged particles in said evacuated chamber and directing the beam at the first beam exit port,
    a first beam working chamber evacuated to a pressure higher than said beam-generating chamber and having a beam entry port in alignment with the beam and said first beam exit port and wherein said longitudinal pipe seam is passed under the beam in said beam working chamber, and
    a second evacuated beam working chamber generally evacuated to the same pressure as said first chamber and being cylindrically shaped to fit within the pipe and with slight radial clearance from the inner pipe wall for free movement of the pipe seam past the beam and for minimum gas leakage from said one pipe end, said second beam working chamber being positioned in alignment with the beam and the longitudinal seam to receive the beam as it penetrates the wall of the pipe at the seam.

2. The device as recited in claim 1 wherein the first beam working chamber is annular and provided with a second annular beam exit port on the radially inner side of the annual chamber with said radially inner side of the annular chamber shaped to fit around the pipe with slight radial clearance from the outer side of the pipe wall for free movement of the pipe past the beam and for minimum gas leakage between the outer side of the pipe and the annular chamber.

3. The device as recited in claim 2 wherein the first annular beam working chamber extends along a preselected axial portion of the welded and unwelded parts of the pipe seam.

4. The device as recited in claim 3 wherein said second beam working chamber extends along a portion of the pipe axially coextensive with said first beam working chamber.

5. The device as recited in claim 3 wherein said annular beam working chamber is further provided with axially flankingly spaced annular chambers evacuated to pressures intermediate to the pressure in said first beam working chamber and said atmospheric pressure, with said intermediate pressure chambers shaped to fit with slight radial clearance from the outer side of the pipe.

6. The device as recited in claim 3 wherein said second beam working chamber is provided on the side facing said one pipe end with a pressure chamber evacuated to a pressure intermediate to the pressure in the second beam working chamber and said atmospheric pressure, with said pressure chamber being shaped to fit with slight radial clearance from the inner side of the pipe for free axial passage of the welded pipe and for minimum gas leakage from said pipe end.

7. The device as recited in claim 5 wherein said second beam working chamber is flanked on both axial sides with a pressure chamber evacuated to a pressure intermediate to the pressure in the second beam working chamber and atmospheric pressure with said pressure chamber being shaped to fit with slight radial clearance from the inner side of the pipe for free axial passage of the welded and unwelded pipe and for minimum gas leakage.

8. The device as recited in claim 1 wherein said beam-generating chamber is provided with a convexly shaped wall with said beam exit port located in said convexly shaped wall and wherein said first beam working chamber is provided with a concavely shaped wall in mating and hermetic sealing relationship with the convexly shaped wall of the beam-generating chamber.

9. A device for working materials with a beam of charged particles comprising
    a housing enclosing an evacuated beam-generating chamber and having a first beam exit port,
    means for generating a beam of charged particles in said housing and directing said beam at said first beam exit port,
    an inner pressure step system secured to the housing and having an evacuated chamber and provided with a first beam entry port and a second beam exit port, each aligned with the beam and the first beam exit port,
    a beam working chamber enclosing a beam working area and having a second beam entry port aligned with said other ports, and with said second beam entry port opposite said second beam exit port and a peripheral side wall projecting towards the workpiece and terminating short thereof with slight clearance to permit the passage of the workpiece,
    an annular pressure step system in surrounding relationship with said beam working chamber peripheral wall and having an annular chamber provided with an annular opening generally adjacently spaced from the beam working area with slight clearance,
    said peripheral wall and said annular pressure step system being movably mounted to one another for movement in a direction parallel with the beam for telescopical adjustment of the beam working chamber relative to the annular chamber to conform to varying workpiece surface shapes, and pumping means operatively effective on said chamber in the housing, the chamber in the inner step system, the beam working chamber and the annular chamber for maintaining a high vacuum in said beam-generating chamber and for removing gas leaking into said beam working chamber through said clearance.

References Cited

UNITED STATES PATENTS

| | | | |
|---|---|---|---|
| 2,844,706 | 7/1958 | Lorenz | 219—121 |
| 2,899,556 | 8/1959 | Schopper et al. | 219—121 |
| 3,043,728 | 7/1962 | Stauffer | 219—121 |
| 3,112,391 | 11/1963 | Sciaky | 219—121 |
| 3,136,882 | 6/1964 | Radtke | 219—121 |
| 3,136,883 | 6/1964 | Radtke | 219—121 |
| 3,219,792 | 11/1965 | Pederson | 219—121 |
| 3,250,842 | 5/1966 | Hikido | 219—121 |
| 3,301,993 | 1/1967 | Boyd et al. | 219—121 |

FOREIGN PATENTS 1,367,806   6/1964   France.

RICHARD M. WOOD, *Primary Examiner.*

W. DEXTER BROOKS, *Assistant Examiner.*

U.S. Cl. X.R.

219—69